United States Patent
Krishnamoorthy et al.

(10) Patent No.: US 7,274,162 B1
(45) Date of Patent: Sep. 25, 2007

(54) MOTOR SPINDLE CONTROL SYSTEM AND METHOD

(75) Inventors: Ravishanker Krishnamoorthy, Singapore (SG); Foo Leng Leong, Singapore (SG)

(73) Assignee: Marvell International Ltd., Hamilton (BM)

( * ) Notice: Subject to any disclaimer, the term of this patent is extended or adjusted under 35 U.S.C. 154(b) by 0 days.

(21) Appl. No.: 11/347,543

(22) Filed: Feb. 3, 2006

Related U.S. Application Data

(60) Provisional application No. 60/714,663, filed on Sep. 6, 2005.

(51) Int. Cl.
*H02P 7/06* (2006.01)

(52) U.S. Cl. .................. 318/254; 318/138; 318/439

(58) Field of Classification Search .............. 318/254, 318/138, 439
See application file for complete search history.

(56) References Cited

U.S. PATENT DOCUMENTS

| | | | | |
|---|---|---|---|---|
| 4,876,491 A * | 10/1989 | Squires et al. | ............... | 318/138 |
| 5,345,156 A * | 9/1994 | Moreira | ..................... | 318/254 |
| 5,801,509 A * | 9/1998 | Sawa et al. | .................. | 318/705 |
| 5,886,489 A * | 3/1999 | Rowan et al. | ............... | 318/439 |
| 6,501,242 B1 * | 12/2002 | Erickson et al. | ............. | 318/560 |
| 6,879,129 B2 * | 4/2005 | Tazawa et al. | .............. | 318/727 |
| 6,998,801 B2 * | 2/2006 | Kurosawa et al. | .......... | 318/254 |
| 2003/0102834 A1 * | 6/2003 | Hussein | ..................... | 318/439 |

* cited by examiner

*Primary Examiner*—Rita Leykin

(57) ABSTRACT

In a motor having a number of poles that have nominally equiangularly-spaced positions that in fact deviate from those positions, the actual pole positions are determined by measuring the periods between zero-crossings of the back-EMF generated during pole-pair interactions. The ratios of the various pole periods can then be computed, and the motor drive current can be adjusted for each pole by applying the respective ratio to a base current value determined from the desired motor speed.

40 Claims, 11 Drawing Sheets

MOTOR SPINDLE CONTROL SYSTEM AND METHOD

CROSS REFERENCE TO RELATED APPLICATION

This claims the benefit of copending U.S. Provisional Patent Application No. 60/714,663, filed Sep. 6, 2005.

BACKGROUND OF THE INVENTION

This invention relates to a system and method for controlling the spindle of an electric motor, and more particularly to a system and method for controlling the spindle of a motor that rotates the platter of a disk drive.

Controlling the speed at which the platter of a disk drive rotates is very important, particularly as storage densities increase and platter size decreases. Thus, in a microdrive—i.e., a drive having a platter diameter of about 1 inch or less—even a small error in angular position resulting from an error in speed control may result in an incorrect sector being read or written. It is therefore a nominal goal to determine disk speed to within 0.01%.

Position, and therefore speed, of a disk drive platter is commonly determined by detecting the back electromotive force (back-EMF) generated when one of the rotor poles passes one of the stator poles. For example, it is typical for a disk drive motor to have six poles, so that each pole-pair interaction theoretically signifies 60° of motor rotation. However, in practice, it is difficult during manufacturing to accurately position the poles. In particular, the rotor may not be perfectly formed, but even if the rotor is perfectly formed, mechanical differences in the windings of the various poles could result in effective positional differences among the poles. Therefore, from an electrical perspective, some sets of adjacent poles may be closer together than 60°, and other sets of adjacent poles may be further apart than 60°. These offsets may be slight, but may be enough to prevent achieving the desired 0.01% accuracy.

Copending, commonly-assigned U.S. patent application Ser. No. 11/104,683, filed Apr. 12, 2005, which is hereby incorporated by reference herein in its entirety, describes a method and apparatus for deriving calibration data for a motor, and a method and apparatus for controlling a motor using that calibration data. In accordance with those methods and apparatus, one phase of the motor power supply is suppressed (i.e., tristated) during a time duration when back-EMF is expected to be detected, and at the same time one of the other phases is grounded and the third phase is pulled high. If the back-EMF is detected outside that duration, the duration is expanded. This is iterated until the back-EMF falls within the expanded duration. In addition, copending, commonly-assigned United States Patent Application Ser. No. 11/345,850, filed Feb. 1, 2006 which is hereby incorporated by reference herein in its entirety, describes a method and apparatus for adjusting the power supply voltage to minimize current spikes during the tristating operation.

The foregoing methods allow clean measurement of back-EMF, and therefore of motor speed. This allows motor speed to be adjusted by adjusting the spindle drive current. However, adjustments occur only once every several revolutions, and between adjustments, the spindle drive current remains constant during motor operation. Therefore, as the rotor rotates with its poles effectively unevenly spaced, the motor speed varies slightly between poles, resulting in potentially unacceptable jitter, even though the average motor speed may be the desired motor speed.

It therefore would be desirable to be able to control the spindle drive current to minimize motor speed variations.

SUMMARY OF THE INVENTION

Pole spacing is determined from the period of the back-EMF waveform. Assuming constant motor speed and uniform pole spacing, the period of the back-EMF waveform would be expected to be constant. However, if motor speed is constant but the period of the back-EMF waveform is not constant, the varying periods can be correlated to nonuniform pole spacing. Thus, in accordance with the invention, the period (preferably as measured between zero crossings) of the back-EMF waveform is measured over a number of electrical periods corresponding to a single revolution—i.e., a number of periods equal to the number of poles. For example, in a six-pole motor, as is commonly used in disk drives, the back-EMF waveform would be measured over six electrical periods. It does not matter when the measurement is started, as long as it is possible to identify which measurement corresponds to which pole. Thus, an index feature may be provided on one of the poles so that each pole can be identified by the number of pole-pair interactions after the index feature is detected.

Once the electrical periods have been measured, the relative pole spacings can be computed by determining the average of the electrical periods, which would be the value of each period in the ideal case where the poles were uniformly spaced, and then computing the ratio of each electrical period to that ideal period. Alternatively, the ratios can be computed by selecting one of the periods as the base period and computing the ratio of the other periods to the base period. The ratios so computed can be stored in association with the motor as described in more detail below. Then, for any desired motor speed, the spindle drive current can be varied in accordance with those ratios on a period-by-period (i.e., pole-by-pole) basis to achieve a uniform motor speed. It does not matter what speed the back-EMF periods are measured at. Although the absolute values of the periods are inversely proportional to speed, the relative values reflected by the ratios stay the same. The relative values may change with temperature if the motor, and particularly the rotor, does not have a uniform coefficient of thermal expansion. However, for a small motor such as in a disk drive, the coefficient of thermal expansion can be assumed to be constant across the entire motor. Therefore, adjustments based on the stored ratios will be valid substantially at any temperature.

Therefore, in accordance with the present invention, there is provided a method for controlling an electric motor having a stator which has a number of poles. The method includes detecting back-EMF from pole-pair interactions, deriving, from the back-EMF detected from pole-pair interactions, relationships comparing periods of respective poles, and adjusting the motor drive current for different portions of each revolution, corresponding to different poles, based on the relationships. Apparatus for carrying out the method is also provided.

BRIEF DESCRIPTION OF THE DRAWINGS

The above and other advantages of the invention will be apparent upon consideration of the following detailed description, taken in conjunction with the accompanying drawings, in which like reference characters refer to like parts throughout, and in which.

DETAILED DESCRIPTION OF THE INVENTION

The invention will now be described with reference to FIGS. 1-4.

Figure 1:
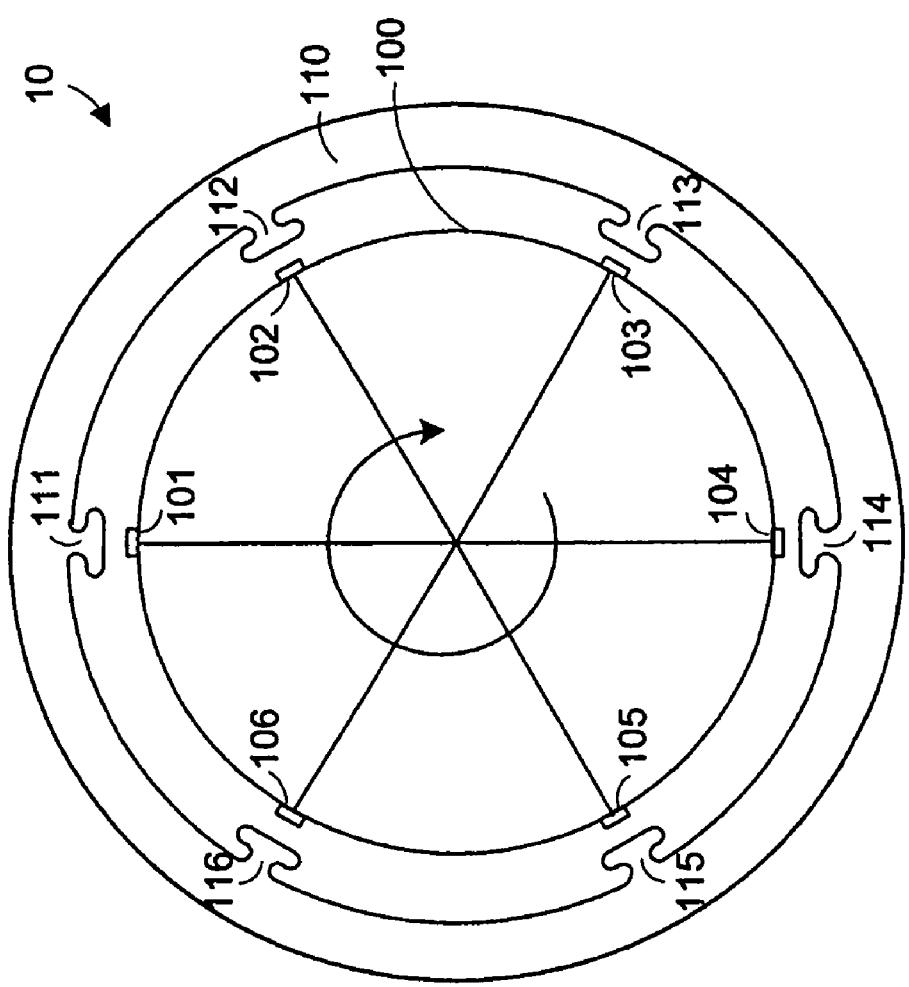
FIG. 1 is a diagrammatic view of theoretical pole placement in a motor, looking along the rotational axis of its rotor.
Figure 2:
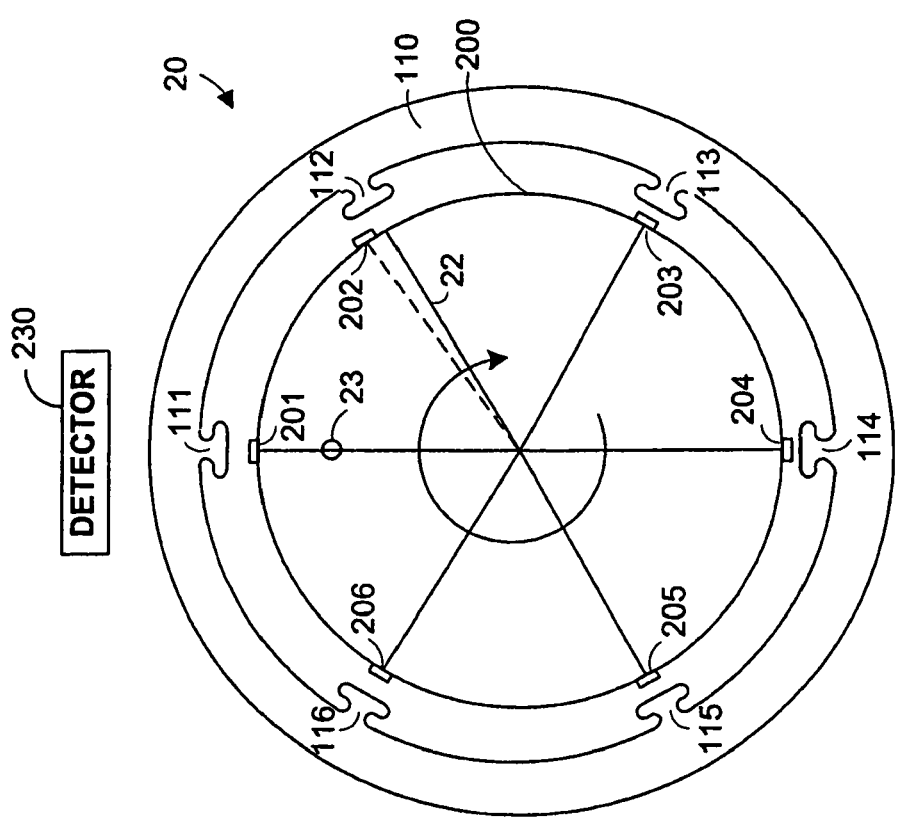
FIG. 2 is a view similar to FIG. 1 with one pole misaligned.

FIG. 1 shows, diagrammatically, the theoretical pole placement in a motor 10 with which the present invention is used. Motor 10 may be, for example, the spindle motor of a disk drive. Although the view of FIG. 1 is theoretical, it may be considered as the view of a portion of a rotor 100, which could be the platter of a disk drive (in either a plan view or a cross-sectional view) taken perpendicular to the rotational axis, or a cross-sectional view of the motor shaft taken perpendicular to the rotational axis. The motor stator 110 is also shown. As seen in FIG. 1, rotor 100 preferably includes six poles 101-106, and stator 110 preferably includes six poles 111-116 to complement poles 101-106.

As discussed above, rotor poles 101-106 preferably are equiangularly distributed, as are stator poles 111-116. On each electrical cycle of the supply voltage, each rotor pole 101-106 advances to the next stator pole 111-116. As a rotor pole passes a stator pole, back-EMF is generated and the occurrence of that back-EMF can be used as an indication that a rotor pole has reached a stator pole, thereby serving as an indicator of rotor position (and therefore speed). If rotor poles 101-106 are in their ideal positions, 60° apart, the position (and speed) of rotor 100 can be accurately determined and controlled. It should be noted that because on each cycle every rotor pole approaches some stator pole, for position and speed detection, preferably the approach of the rotor poles to one particular stator pole—e.g., stator pole 112—is used for position and speed detection.

However, also as discussed above, manufacturing conditions may result in one or more of rotor poles 101-106 and/or stator poles 111-116 being slightly displaced from their ideal positions. Such displacement can be actual displacement, resulting from manufacturing tolerances, or can be an effective electrical displacement, resulting from differences in the windings from pole to pole. One example is shown in motor 20 of FIG. 2 where rotor 200 has six rotor poles 201-206, with pole 202 somewhat closer to pole 201 than 60° and correspondingly somewhat further from pole 203 than 60°.

Ideally, there is a constant relationship for a given motor between the back-EMF constant ($K_b$) and the torque constant ($K_t$) of the motor. In particular, $K_t$ may be expressed in Newton-meters per Ampere (N-m/A), while $K_b$ may be expressed either in volts per RPM (V/RPM) or volts per radians-per-second (V/(rad/s)). Not only is $K_b/K_t$ normally a constant for a given motor, but if $K_b$ is expressed in V/(rad/s), that constant is unity. For example, if $K_b$=0.001 V/(rad/s), then $K_t$=0.001 N-m/A.

It is apparent, then, that if the current applied at each pole-pair interaction is the same, the torque applied to the motor will be the same. But if those applications of torque are not uniformly spaced, then the motor speed will not be uniform. Instead, the speed will fluctuate from pole to pole, even though it may average the desired speed. In other words, it will exhibit jitter.

Figure 3:
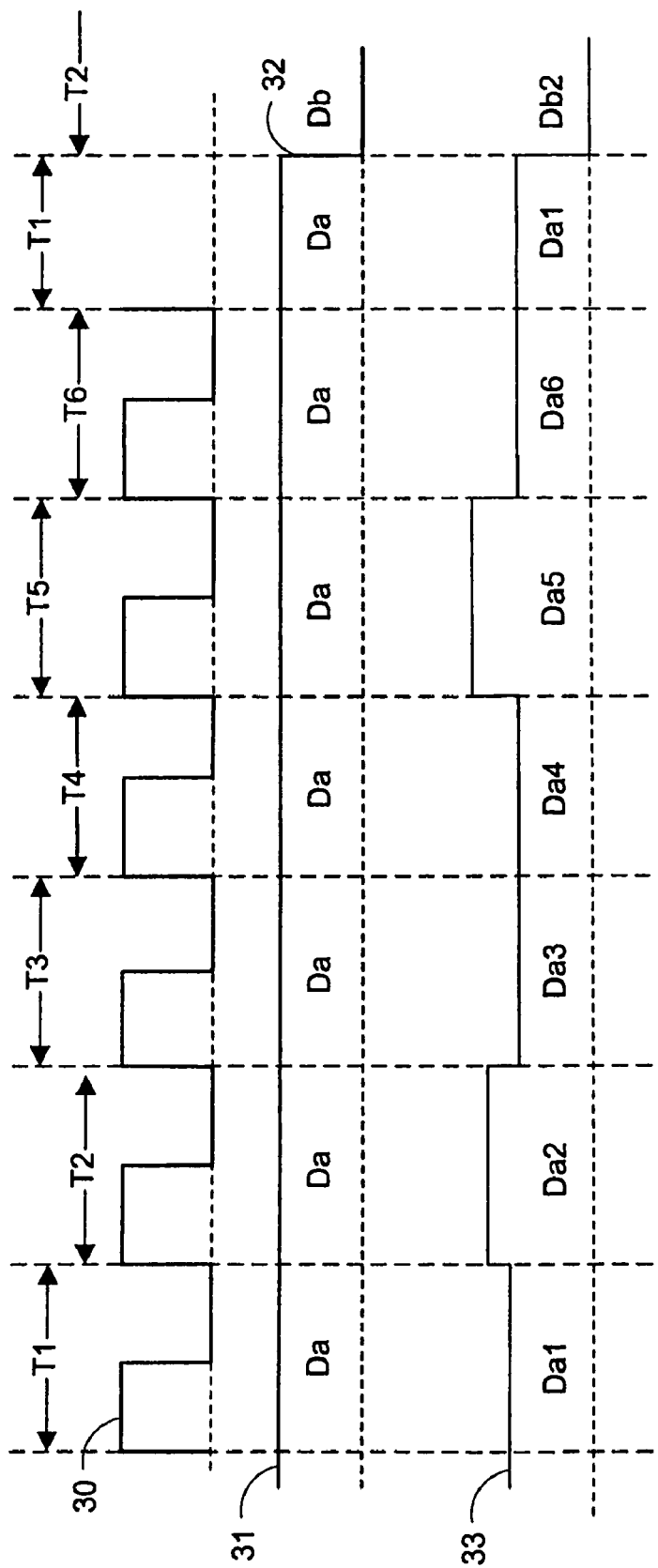
FIG. 3 is a graphical representation of a number of signals in accordance with the present invention.

This discrepancy is accounted for in accordance with the present invention by varying the current applied to motor 20 according to the pole positions. The pole positions can be measured by measuring the electrical periods of the back-EMF 30 in one mechanical period (i.e., one revolution) of motor 20. As seen in FIG. 3, the periods $T_1$-$T_6$, as measured between zero-crossings of the back-EMF trace 30, appear to be uniform, but they may vary slightly from one another (to a degree not visible in FIG. 3) as discussed above. Ratios may then be computed to express the relationship of each $T_n$ to the other $T_n$s. These ratios preferably are ratios of each $T_n$ to an average (or ideal) $T_n$, but alternatively one particular $T_n$ can be chosen (arbitrarily) as the reference and assigned a ratio of 1, while the other $T_n$s are assigned ratios relative to that particular $T_n$. The current applied during a particular $T_n$ is then determined by multiplying the ratio for that $T_n$ by the average current required to obtain the desired motor speed. It will be apparent that for a shorter $T_n$, meaning that the distance between the present pole and the next pole is smaller, the also current should be smaller, because the torque needed to carry that pole to the next position is smaller, and conversely for a larger $T_n$.

In FIG. 3, signal 31 represents a digital-to-analog converter (DAC) control signal that encodes the motor current in an ideal motor. The signal is constant at level $D_a$ over all $T_n$ (until changed, e.g., to $D_b$ at 32, by a user input or as directed by some external device such as a personal computer that is commanding the motor control circuitry). Trace 33, on the other hand, represents the varying DAC control signal according to the present invention, where during each $T_n$, the DAC control signal assumes a value $D_{an}$ or $D_{bn}$ (n=1, . . . , 6) according to the aforementioned ratios. It should be noted that trace 33 is purely illustrative and not taken from any actual data. Accordingly, the variations from period to period may be exaggerated. Moreover, trace 33 will vary from motor to motor depending on the particular pole mismatches of the motors.

As mentioned above, the relative periods are constant for motor 20 once manufactured, and therefore need be measured only once, and associated in memory with their respective poles. To allow the control circuitry to know which pole is the present pole, so that the correct stored values are used, a marker 23, which may be an optical or magnetic mark, or any other suitably detectable mark, can be placed on rotor 200 adjacent rotor pole 201 as a reference. Control circuitry 40 (FIG. 4) preferably can count cycles from the detection of that marker—e.g., by a suitable optical or inductive detector 230, identify the current pole, look up the appropriate ratio, and adjust accordingly the DAC control signal $D_{an}$ or $D_{bn}$ to maintain constant motor speed.

Figure 4:
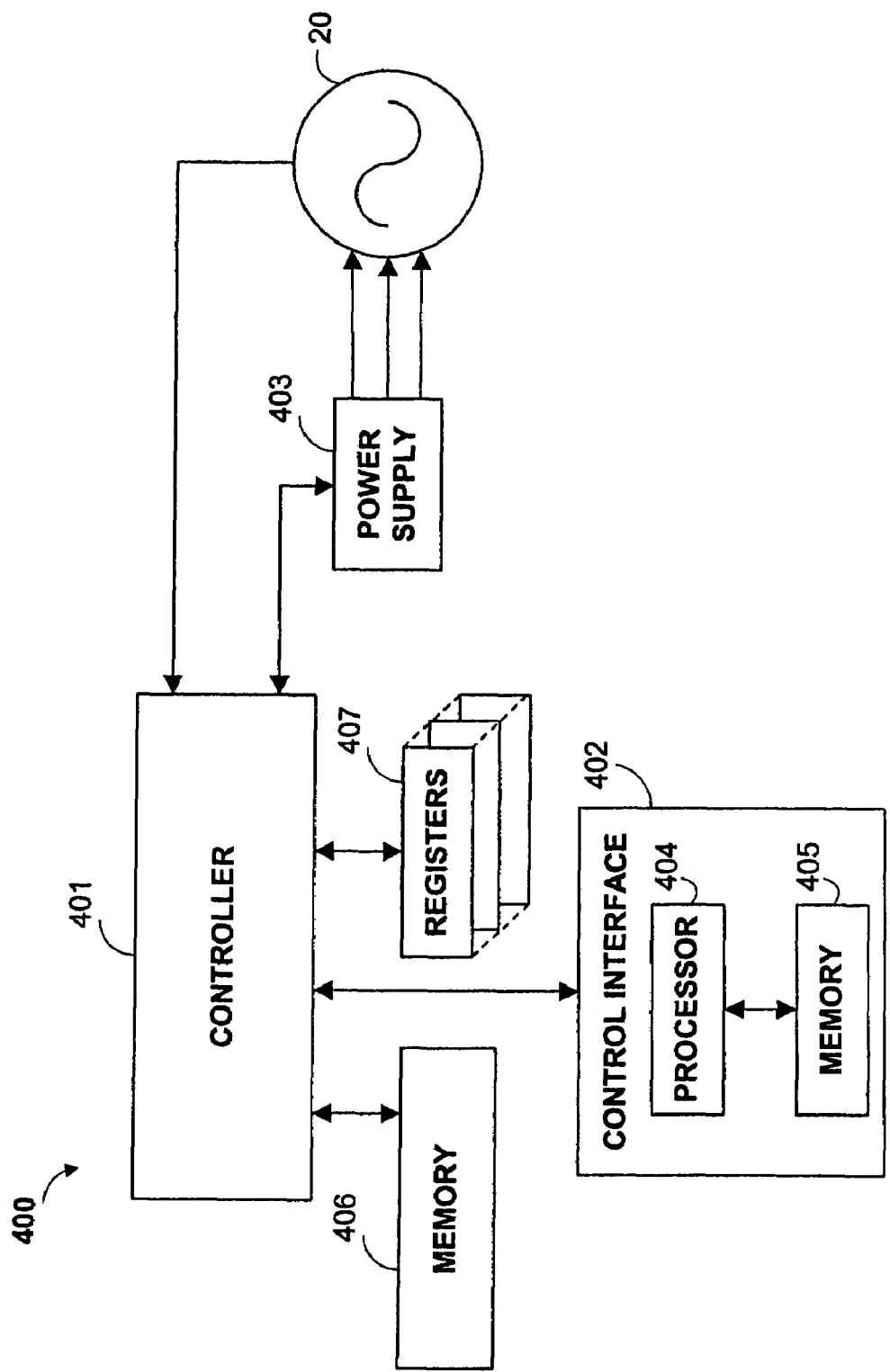
FIG. 4 is a schematic diagram of motor and control circuitry in accordance with the present invention.

As seen in FIG. 4, motor control circuitry 40 includes a motor controller 401, a motor control interface 402, and a power supply 403. Motor controller 401 is sometimes referred to as a Pcombo or power combo chip, and is normally mounted at or near spindle motor 20, controlling both spindle motor 20 and the voice-coil motor (not shown) that moves the read/write head. Motor control interface 402 is sometimes referred to as the device system-on-a-chip or SoC, and is normally removed from motor 20 itself, as it is the main controller and interface of the device (e.g., a disk drive) of which motor 20 is a part. The present invention preferably is carried out in motor control interface 402 by processor 404 thereof, using memory 405 thereof. Alternatively, however, the invention may be carried out in motor controller 401.

$T_n$ is commonly measured by an electrical period counter (not separately shown) at 20-bit resolution. Therefore, it is known for both motor controller 401 and motor control interface 402 to measure the various $T_n$ from the back-EMF signal 30, because it would be difficult, if only one of motor controller 401 and motor control interface 402 were to measure $T_n$, to pass a 20-bit number between them in real time. Thus, no additional circuitry is required for either motor controller 401 or motor control interface 402 to measure $T_n$, whichever is chosen to carry out the invention. As discussed above, no other significant modifications are required if motor control interface 402 is to carry out the invention, as it already has processor 404 and memory 405. However, if motor controller 401 is to carry out the invention, it would be necessary to add additional logic 406, as well as a number (equal to the number n of poles) of registers 407 to store the n values of $T_n$. Each of registers 407 would have to be large enough to store its respective $T_n$ value at the precision at which it is measured. Thus, for a six-pole motor in a system where $T_n$ is measured to 20-bit precision, six 20-bit registers 407 would be required.

In a preferred embodiment, the DAC control signal may be 9 bits wide, while the electrical period counter, as discussed above, may be 20 bits wide. The DAC control signal is thus of lower resolution than the quantity being adjusted. The compensation can be made more accurate by using only some portion of the full width of the electrical period counter.

For example, assume a 20 MHz clock, which would have a clock period Tclk=$1/(2\times10^7)$ sec=50 ns. A 20 bit counter would count up to $2^{20}$ such periods, giving $T_{max}$=220×50 ns 52.4 ms. Assume also that pole-position deviation is about +/−5% (maximum expected variation is about +/−10%).

Although the counter has a maximum count period of 52.4 ms, in normal operation the expected period (which depends on the particular motor and on speed) is typically about 2 ms. Thus, the counter needs only a resolution of about 2 ms/50 ns which is 16 bits. +/−5% of these 16 bits is 12 bits.

Therefore, we could split the bits of the electrical period counter into sections as follows:

| | |
|---|---|
| B19-B16: | Not normally used (used only during startup) |
| B15-B12: | Most significant bits of the electrical period count. |
| B11-B0: | 10% of actual counts |

If one were to use all twenty bits in evaluating (DAC)×$(T_n/T_{avg})$, one would be wasting chip area because B19-B16 would not be used during actual operations. Thus, instead of computing (DAC)×$(T_n/T_{avg})$ every time for all 20 bits, one can simply perform the calculations based on the first 16 bits B15-B0 of the period counter.

Thus it is seen that a method and apparatus for controlling motor speed to avoid jitter, notwithstanding pole position deviations, has been provided.

Referring now to FIGS. 5-11, exemplary implementations of the present invention are shown.

Figure 5:
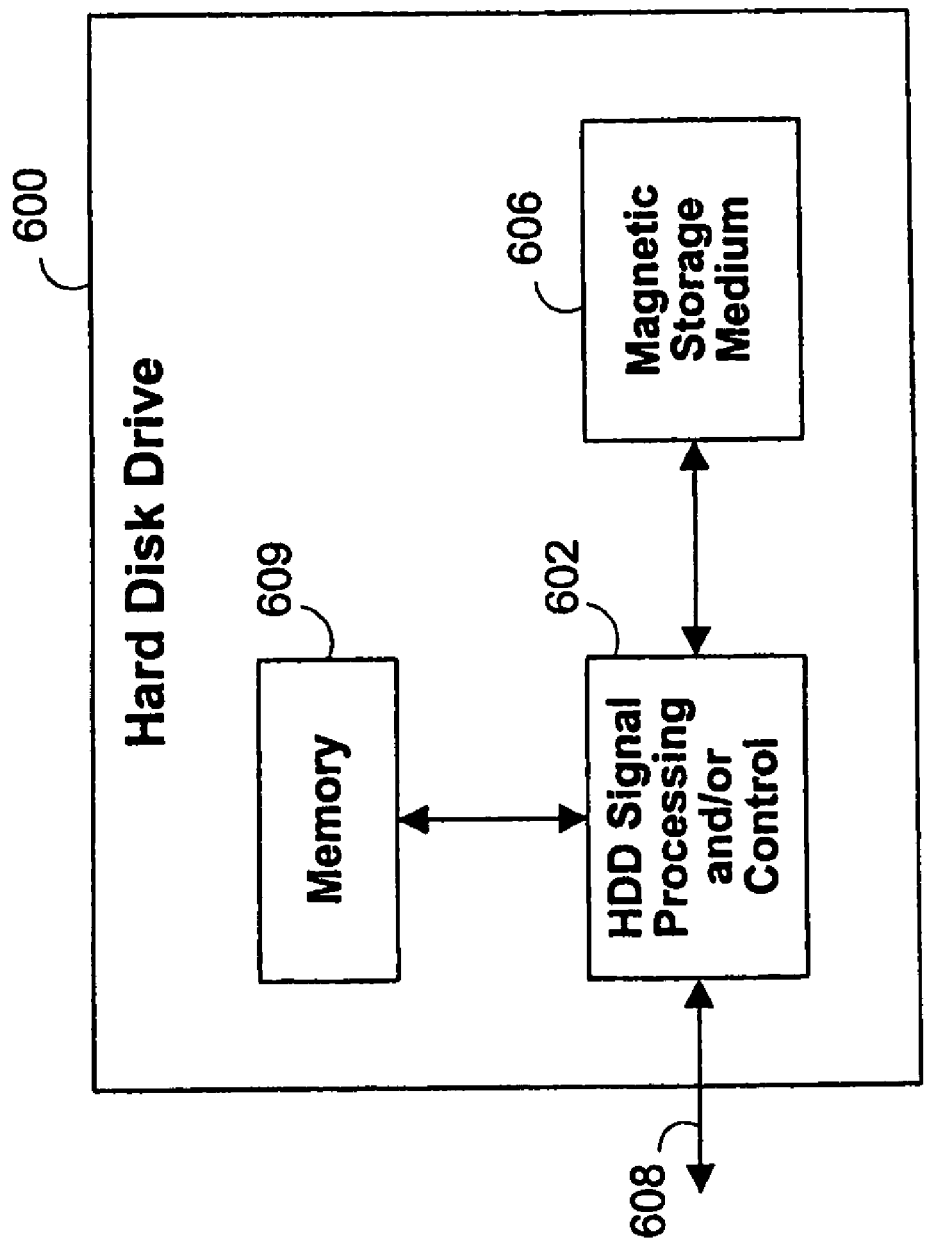
FIG. 5 is a block diagram of an exemplary hard disk drive that can employ the disclosed technology.

Referring now to FIG. 5 the present invention can be implemented in a hard disk drive 600. The present invention may implement either or both signal processing and/or control circuits, which are generally identified in FIG. 5 at 602. In some implementations, the signal processing and/or control circuit 602 and/or other circuits (not shown) in the HDD 600 may process data, perform coding and/or encryption, perform calculations, and/or format data that is output to and/or received from a magnetic storage medium 606.

The HDD 600 may communicate with a host device (not shown) such as a computer, mobile computing devices such as personal digital assistants, cellular telephones, media or MP3 players and the like, and/or other devices, via one or more wired or wireless communication links 608. The HDD 600 may be connected to memory 609 such as random access memory (RAM), low latency nonvolatile memory such as flash memory, read only memory (ROM) and/or other suitable electronic data storage.

Figure 6:
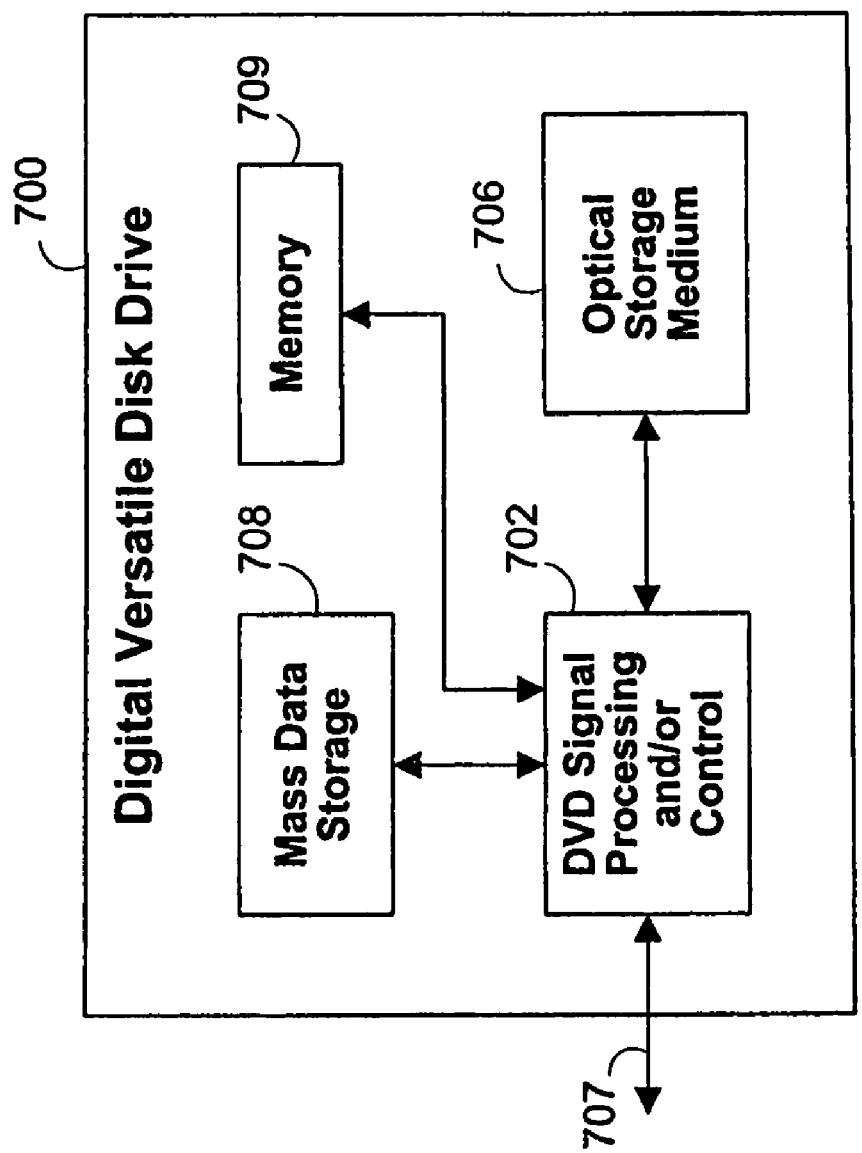
FIG. 6 is a block diagram of an exemplary digital versatile disk drive that can employ the disclosed technology.

Referring now to FIG. 6 the present invention can be implemented in a digital versatile disk (DVD) drive 700. The present invention may implement either or both signal processing and/or control circuits, which are generally identified in FIG. 6 at 712, and/or mass data storage of the DVD drive 700. The signal processing and/or control circuit 712 and/or other circuits (not shown) in the DVD drive 700 may process data, perform coding and/or encryption, perform calculations, and/or format data that is read from and/or data written to an optical storage medium 716. In some implementations, the signal processing and/or control circuit 712 and/or other circuits (not shown) in the DVD drive 700 can also perform other functions such as encoding and/or decoding and/or any other signal processing functions associated with a DVD drive.

DVD drive 700 may communicate with an output device (not shown) such as a computer, television or other device, via one or more wired or wireless communication links 717. The DVD drive 700 may communicate with mass data storage 718 that stores data in a nonvolatile manner. The mass data storage 718 may include a hard disk drive (HDD). The HDD may have the configuration shown in FIG. 5 The HDD may be a mini-HDD that includes one or more platters having a diameter that is smaller than approximately 1.8". The DVD drive 700 may be connected to memory 719 such as RAM, ROM, low-latency nonvolatile memory such as flash memory, and/or other suitable electronic data storage.

Figure 7:
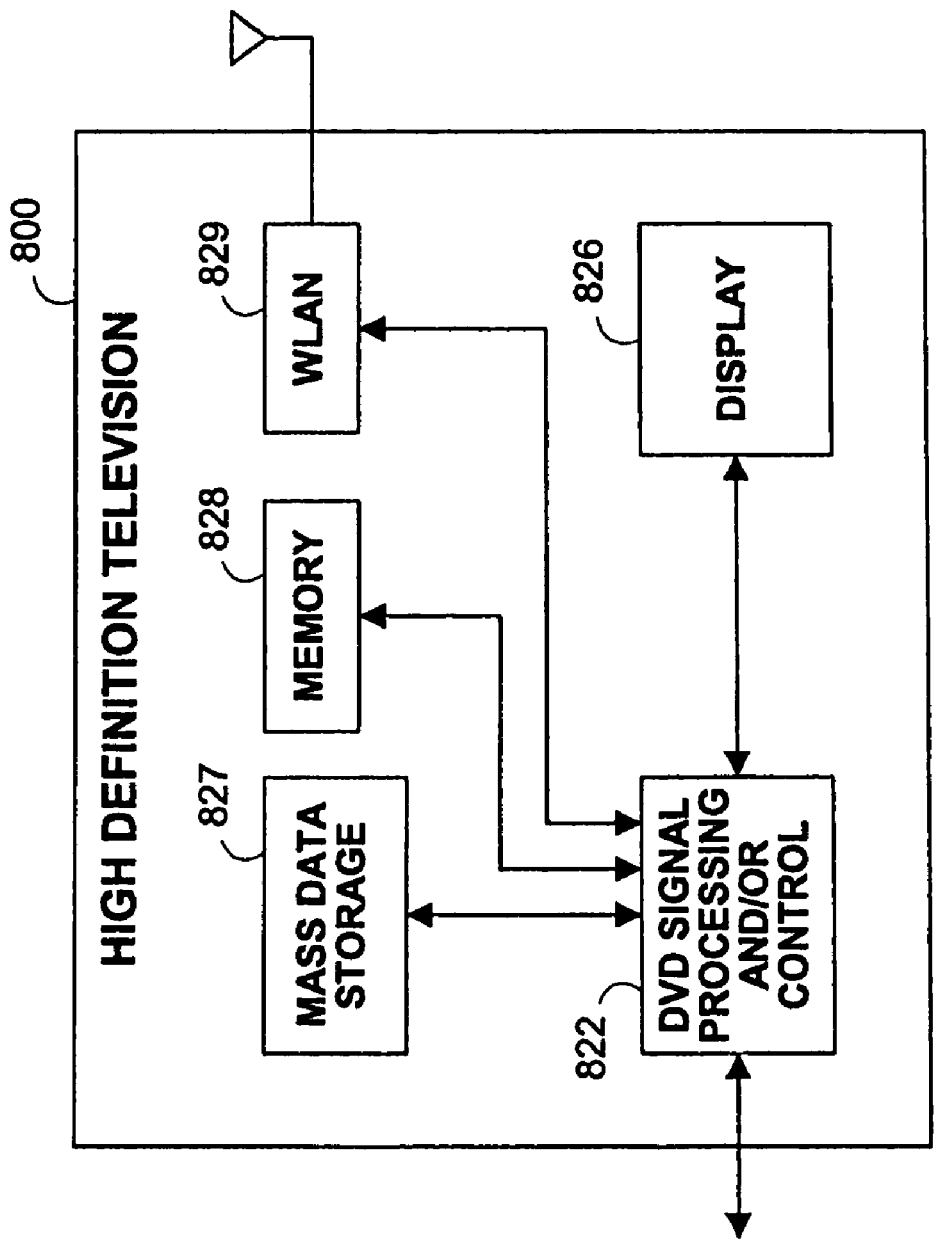
FIG. 7 is a block diagram of an exemplary high definition television that can employ the disclosed technology.

Referring now to FIG. 7, the present invention can be implemented in a high definition television (HDTV) 800. The present invention may implement either or both signal processing and/or control circuits, which are generally identified in FIG. 7 at 822, a WLAN interface and/or mass data storage of the HDTV 800. The HDTV 800 receives HDTV input signals in either a wired or wireless format and generates HDTV output signals for a display 826. In some implementations, signal processing circuit and/or control circuit 822 and/or other circuits (not shown) of the HDTV 820 may process data, perform coding and/or encryption, perform calculations, format data and/or perform any other type of HDTV processing that may be required.

The HDTV 800 may communicate with mass data storage 827 that stores data in a nonvolatile manner such as optical and/or magnetic storage devices. At least one HDD may have the configuration shown in FIG. 5 and/or at least one DVD drive may have the configuration shown in FIG. 6. The HDD may be a mini-HDD that includes one or more platters having a diameter that is smaller than approximately 1.8". The HDTV 800 may be connected to memory 1028 such as RAM, ROM, low-latency nonvolatile memory such as flash memory, and/or other suitable electronic data storage. The HDTV 800 also may support connections with a WLAN via a WLAN network interface 829.

Figure 8:
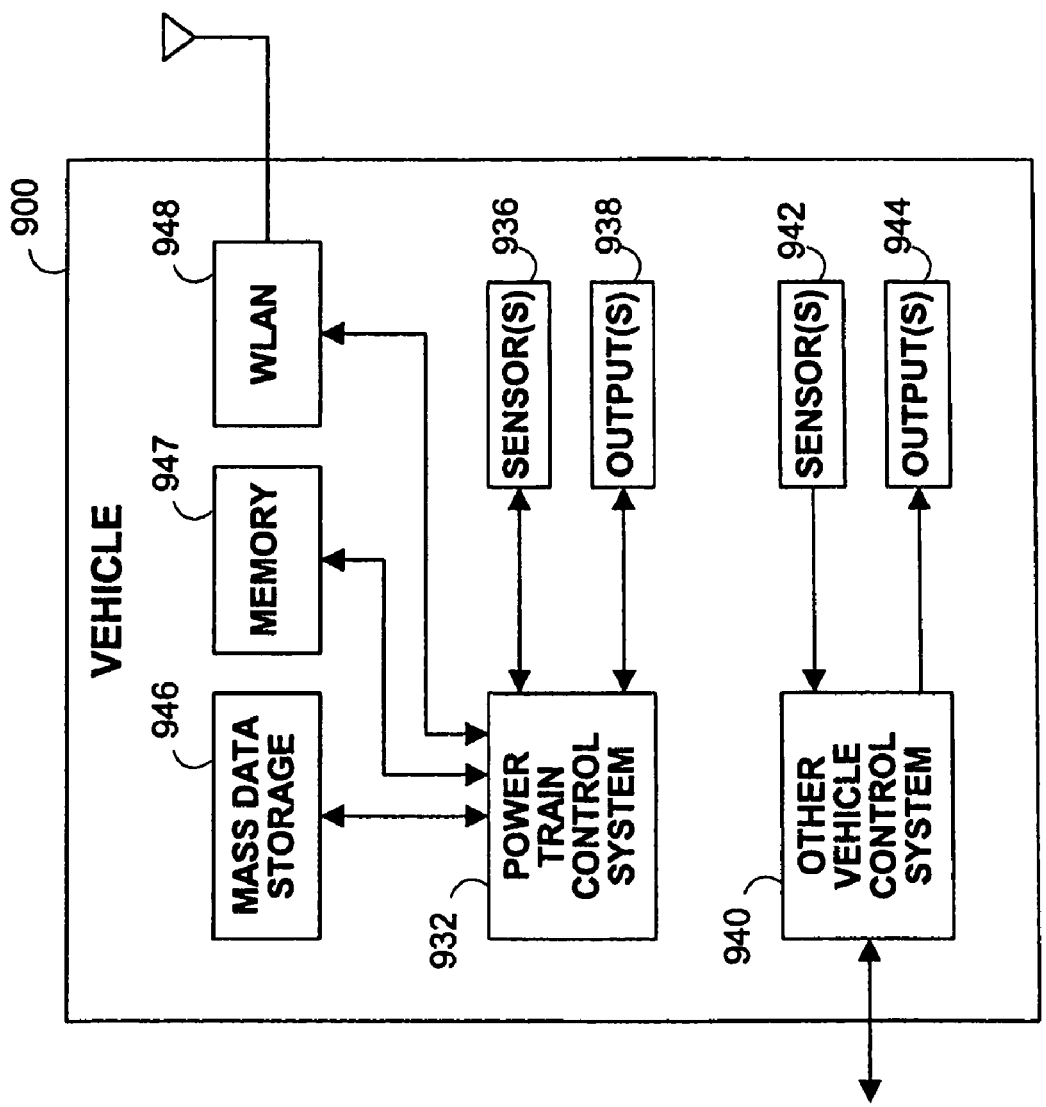
FIG. 8 is a block diagram of an exemplary vehicle that can employ the disclosed technology.

Referring now to FIG. 8, the present invention implements a control system of a vehicle 900, a WLAN interface and/or mass data storage of the vehicle control system. In some implementations, the present invention may implement a powertrain control system 932 that receives inputs from one or more sensors such as temperature sensors, pressure sensors, rotational sensors, airflow sensors and/or any other suitable sensors and/or that generates one or more output control signals such as engine operating parameters, transmission operating parameters, and/or other control signals.

The present invention may also be implemented in other control systems 940 of the vehicle 900. The control system 940 may likewise receive signals from input sensors 942 and/or output control signals to one or more output devices 944. In some implementations, the control system 940 may be part of an anti-lock braking system (ABS), a navigation system, a telematics system, a vehicle telematics system, a lane departure system, an adaptive cruise control system, a vehicle entertainment system such as a stereo, DVD, compact disc and the like. Still other implementations are contemplated.

The powertrain control system 932 may communicate with mass data storage 946 that stores data in a nonvolatile manner. The mass data storage 946 may include optical and/or magnetic storage devices for example hard disk drives HDD and/or DVDs. At least one HDD may have the configuration shown in FIG. 5 and/or at least one DVD drive may have the configuration shown in FIG. 6. The HDD may be a mini-HDD that includes one or more platters having a diameter that is smaller than approximately 1.8". The powertrain control system 932 may be connected to memory 947 such as RAM, ROM, low latency nonvolatile memory such as flash memory, and/or other suitable electronic data storage. The powertrain control system 932 also may support connections with a WLAN via a WLAN network interface 948. The control system 940 may also include mass data storage, memory and/or a WLAN interface (none shown).

Figure 9:
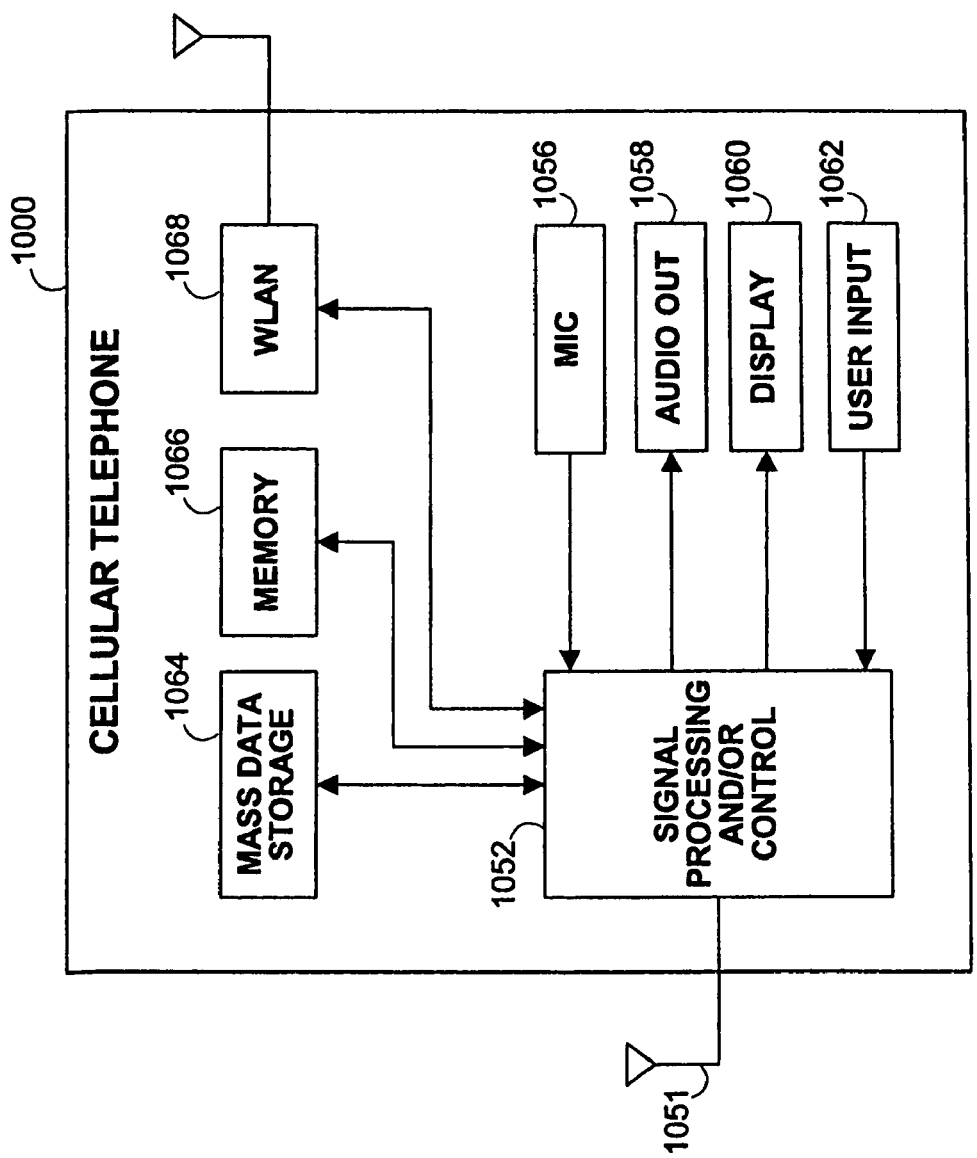
FIG. 9 is a block diagram of an exemplary cellular telephone that can employ the disclosed technology.

Referring now to FIG. 9, the present invention can be implemented in a cellular telephone 1000 that may include a cellular antenna 1051. The present invention may implement either or both signal processing and/or control circuits, which are generally identified in FIG. 9 at 1052, a WLAN interface and/or mass data storage of the cellular phone 1050. In some implementations, the cellular telephone 1050 includes a microphone 1056, an audio output 1058 such as a speaker and/or audio output jack, a display 1060 and/or an input device 1062 such as a keypad, pointing device, voice actuation and/or other input device. The signal processing and/or control circuits 1052 and/or other circuits (not shown) in the cellular telephone 1050 may process data, perform coding and/or encryption, perform calculations, format data and/or perform other cellular telephone functions.

The cellular telephone 1050 may communicate with mass data storage 1064 that stores data in a nonvolatile manner such as optical and/or magnetic storage devices—for example hard disk drives (HDDs) and/or DVDs. At least one HDD may have the configuration shown in FIG. 5 and/or at least one DVD drive may have the configuration shown in FIG. 6. The HDD may be a mini-HDD that includes one or more platters having a diameter that is smaller than approximately 1.8". The cellular telephone 1000 may be connected to memory 1066 such as RAM, ROM, low-latency nonvolatile memory such as flash memory, and/or other suitable electronic data storage. The cellular telephone 1000 also may support connections with a WLAN via a WLAN network interface 1068.

Figure 10:
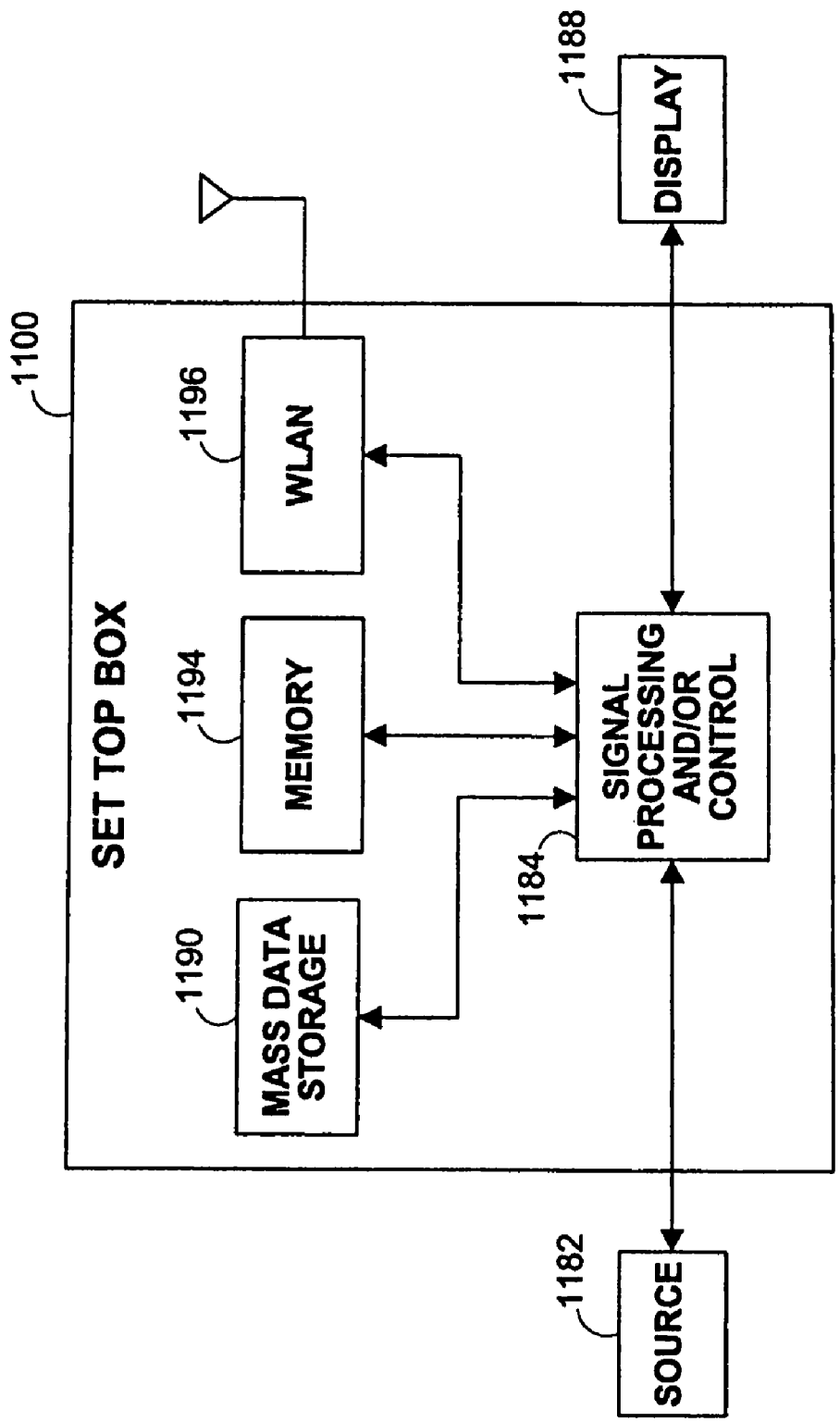
FIG. 10 is a block diagram of an exemplary set top box that can employ the disclosed technology.

Referring now to FIG. 10, the present invention can be implemented in a set top box 1100. The present invention may implement either or both signal processing and/or control circuits, which are generally identified in FIG. 10 at 1184, a WLAN interface and/or mass data storage of the set top box 1180. Set top box 1180 receives signals from a source 1182 such as a broadband source and outputs standard and/or high definition audio/video signals suitable for a display 1188 such as a television and/or monitor and/or other video and/or audio output devices. The signal processing and/or control circuits 1184 and/or other circuits (not shown) of the set top box 1180 may process data, perform coding and/or encryption, perform calculations, format data and/or perform any other set top box function.

Set top box 1100 may communicate with mass data storage 1190 that stores data in a nonvolatile manner. The mass data storage 1190 may include optical and/or magnetic storage devices for example hard disk drives HDD and/or DVDs. At least one HDD may have the configuration shown in FIG. 5 and/or at least one DVD drive may have the configuration shown in FIG. 6. The HDD may be a mini-HDD that includes one or more platters having a diameter that is smaller than approximately 1.8". Set top box 1100 may be connected to memory 1194 such as RAM, ROM, low-latency nonvolatile memory such as flash memory, and/or other suitable electronic data storage. Set top box 1100 also may support connections with a WLAN via a WLAN network interface 1196.

Figure 11:
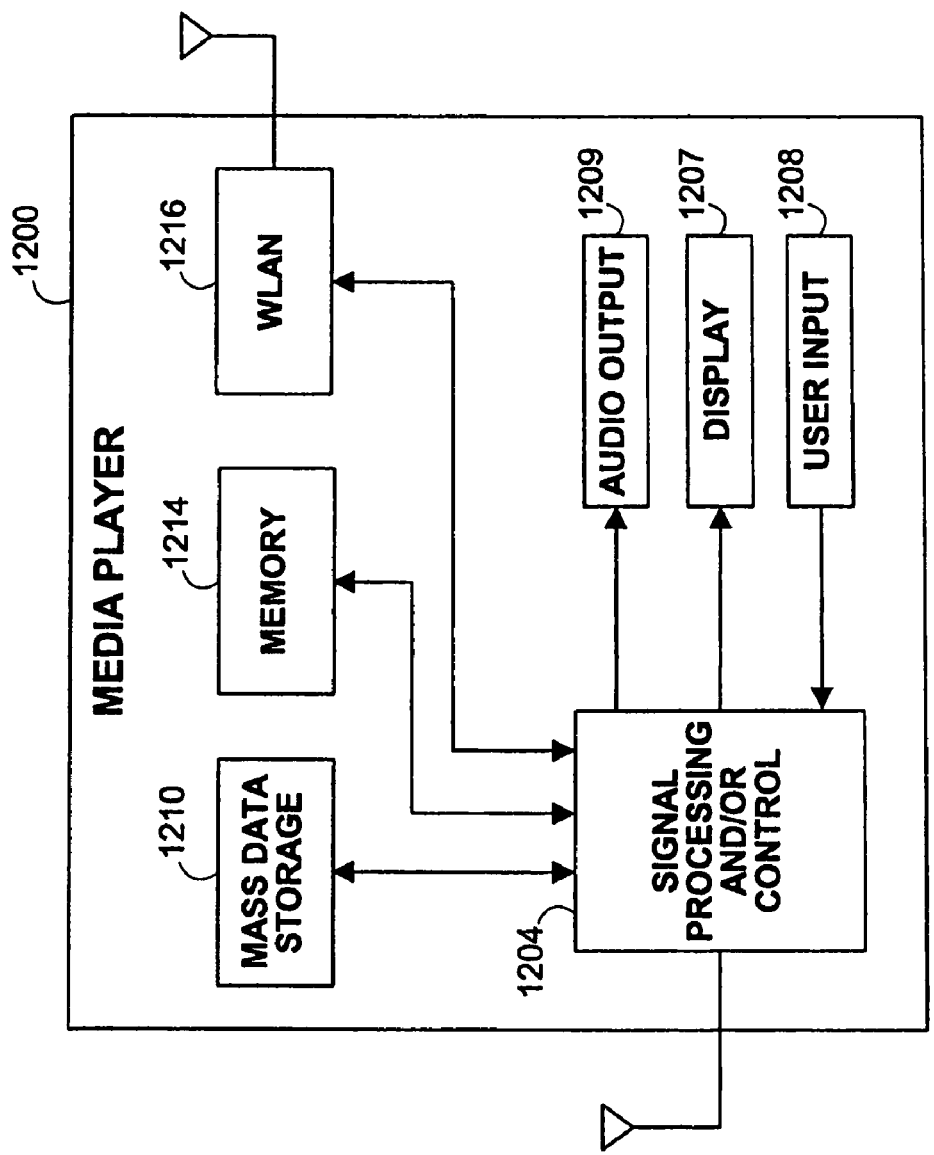
FIG. 11 is a block diagram of an exemplary media player that can employ the disclosed technology.

Referring now to FIG. 11, the present invention can be implemented in a media player 1200. The present invention may implement either or both signal processing and/or control circuits, which are generally identified in FIG. 20 at 1204, a WLAN interface and/or mass data storage of the media player 1200. In some implementations, the media player 1200 includes a display 1207 and/or a user input 1208 such as a keypad, touchpad and the like. In some implementations, the media player 1200 may employ a graphical user interface (GUI) that typically employs menus, drop down menus, icons and/or a point-and-click interface via the display 1207 and/or user input 1208. Media player 1200 further includes an audio output 1209 such as a speaker and/or audio output jack. The signal processing and/or control circuits 1204 and/or other circuits (not shown) of media player 1200 may process data, perform coding and/or encryption, perform calculations, format data and/or perform any other media player function.

Media player 1200 may communicate with mass data storage 1210 that stores data such as compressed audio and/or video content in a nonvolatile manner. In some implementations, the compressed audio files include files that are compliant with MP3 format or other suitable compressed audio and/or video formats. The mass data storage may include optical and/or magnetic storage devices for example hard disk drives HDD and/or DVDs. At least one HDD may have the configuration shown in FIG. 5 and/or at least one DVD drive may have the configuration shown in FIG. 6. The HDD may be a mini-HDD that includes one or more platters having a diameter that is smaller than approximately 1.8". Media player 1200 may be connected to memory 1214 such as RAM, ROM, low-latency nonvolatile memory such as flash memory, and/or other suitable electronic data storage. Media player 1200 also may support connections with a WLAN via a WLAN network interface 1216. Still other implementations in addition to those described above are contemplated.

It will be understood that the foregoing is only illustrative of the principles of the invention, and that the invention can be practiced by other than the described embodiments, which are presented for purposes of illustration and not of limitation, and the present invention is limited only by the claims which follow.

What is claimed is:

1. A method for controlling a motor, said motor having a number of poles, said method comprising:
    detecting back-EMF from pole-pair interactions;
    deriving, from said back-EMF detected from pole-pair interactions, ratios comparing periods of respective poles; and
    adjusting motor drive current, for different portions of each revolution, corresponding to different poles, based on said ratios, by multiplying a base drive current by said ratios.

2. The method of claim 1 wherein said detecting comprises detecting respective interactions of each respective rotor pole with a predetermined stator pole.

3. The method of claim 1 wherein said detecting comprises detecting respective interactions of each respective stator pole with a predetermined rotor pole.

4. The method of claim 1 wherein said base drive current is determined by a desired motor speed.

5. The method of claim 1 further comprising storing said ratios.

6. The method of claim 5 wherein said storing comprises storing said ratios in a motor controller.

7. The method of claim 6 wherein said adjusting is carried out by said motor controller using said stored ratios.

8. The method of claim 6 wherein said adjusting is carried out by a motor control interface using said stored ratios.

9. The method of claim 5 wherein said storing comprises storing said ratios in a motor control interface.

10. The method of claim 9 wherein said adjusting is carried out by said motor control interface using said stored ratios.

11. Apparatus for controlling a motor, said motor having a number of poles, said apparatus comprising:
    means for detecting back-EMF from pole-pair interactions;
    means for deriving, from said back-EMF detected from pole-pair interactions, ratios comparing periods of respective poles; and
    means for adjusting motor drive current, for different portions of each revolution, corresponding to different poles, based on said ratios, by multiplying a base drive current by said ratios.

12. The apparatus of claim 11 wherein said means for detecting detects respective interactions of each respective rotor pole with a predetermined stator pole.

13. The apparatus of claim 11 wherein said means for detecting detects respective interactions of each respective stator pole with a predetermined rotor pole.

14. The apparatus of claim 11 wherein said base drive current is determined by a desired motor speed.

15. The apparatus of claim 11 further comprising means for storing said ratios.

16. The apparatus of claim 15 further comprising:
    means for motor control; wherein:
    said means for storing comprises memory means in said means for motor control.

17. The apparatus of claim 16 wherein said memory means comprises register means.

18. The apparatus of claim 17 comprising a number of said register means equal to said number of poles.

19. The apparatus of claim 16 wherein said means for adjusting is part of said means for motor control and operates on said stored ratios.

20. The apparatus of claim 16 further comprising:
    means for motor control interfacing; wherein:
    said means adjusting is part of said means for motor control interfacing and operates on said stored ratios.

21. The apparatus of claim 15 further comprising:
    means for motor control interfacing; wherein:
    said means for storing comprises memory means in said means for motor control interfacing.

22. The apparatus of claim 21 wherein said means for adjusting is part of said motor control interface and operates on said stored ratios.

23. Apparatus for controlling a motor, said motor having a number of poles, said apparatus comprising:
    back-EMF detection circuitry that detects back-EMF from pole-pair interactions;
    a processor that derives, from said back-EMF detected from pole-pair interactions, ratios comparing periods of respective poles; and
    drive current adjusting circuitry that adjusts motor drive current, for different portions of each revolution, corresponding to different poles, based on said ratios, by multiplying said base drive current by said ratios.

24. The apparatus of claim 23 wherein said back-EMF detection circuitry detects respective interactions of each respective rotor pole with a predetermined stator pole.

25. The apparatus of claim 23 wherein said back-EMF detection circuitry detects respective interactions of each respective stator pole with said predetermined rotor pole.

26. The apparatus of claim 23 wherein said base drive current is determined by a desired motor speed.

27. The apparatus of claim 23 further comprising memory for storing said ratios.

28. The apparatus of claim 27 further comprising:
    a motor controller; wherein:
    said memory is in said motor controller.

29. The apparatus of claim 28 wherein said memory comprises at least one register.

30. The apparatus of claim 29 comprising a number of said registers equal to said number of poles.

31. The apparatus of claim 28 wherein said drive current adjusting circuitry is part of said motor controller and operates on said stored ratios.

32. The apparatus of claim 28 further comprising:
    a motor control interface; wherein:
    drive current adjusting circuitry is part of said motor control interface and operates on said stored ratios.

33. The apparatus of claim 27 further comprising:
    a motor control interface; wherein:
    said memory is in said motor control interface.

34. The apparatus of claim 33 wherein said drive current adjusting circuitry is part of said motor control interface and operates on said stored ratios.

35. The apparatus of claim 23 wherein said ratios compare each respective pole period to an average pole period.

36. The apparatus of claim 23 wherein:
one of said pole periods is identified as a base pole period; and
said ratios compare each other pole period to said base pole period.

37. The apparatus of claim 11 wherein said ratios compare each respective pole period to an average pole period.

38. The apparatus of claim 11 wherein:
one of said pole periods is identified as a base pole period; and
said ratios compare each other pole period to said base pole period.

39. The method of claim 1 wherein said ratios compare each respective pole period to an average pole period.

40. The method of claim 1 wherein:
one of said pole periods is identified as a base pole period; and
said ratios compare each other pole period to said base pole period.

\* \* \* \* \*